United States Patent
Vaught

(10) Patent No.: US 8,696,112 B1
(45) Date of Patent: Apr. 15, 2014

(54) MAGNETIC SECUREMENT DEVICE FOR EYEWEAR ON HATS

(71) Applicant: Richard M. Vaught, The Villages, FL (US)

(72) Inventor: Richard M. Vaught, The Villages, FL (US)

( * ) Notice: Subject to any disclaimer, the term of this patent is extended or adjusted under 35 U.S.C. 154(b) by 0 days.

(21) Appl. No.: 14/017,724

(22) Filed: Sep. 4, 2013

(51) Int. Cl.
*G02C 3/00* (2006.01)
*A61F 9/00* (2006.01)
*G02C 3/02* (2006.01)
*A42B 1/24* (2006.01)

(52) U.S. Cl.
CPC . *G02C 3/02* (2013.01); *A42B 1/247* (2013.01); *G02C 2200/02* (2013.01)
USPC .................................. 351/155; 351/158; 2/10

(58) Field of Classification Search
CPC ....... G02C 3/02; G02C 2200/02; A42B 1/247
USPC ............................. 351/155, 158; 2/10, 209.13
See application file for complete search history.

(56) References Cited

U.S. PATENT DOCUMENTS

| | | | |
|---|---|---|---|
| 2,644,212 A | | 7/1953 | Markowitz |
| 3,178,784 A | | 4/1965 | Krauthamer |
| 4,136,934 A | | 1/1979 | Seron |
| 4,179,753 A | * | 12/1979 | Aronberg et al. ................ 2/10 |
| 4,458,384 A | | 7/1984 | Arnold |
| 4,969,239 A | | 11/1990 | Bruno |
| 5,491,842 A | * | 2/1996 | Braswell-Moore ............. 2/10 |
| 5,794,312 A | | 8/1998 | O'Mahony |
| 5,842,613 A | | 12/1998 | White |
| 5,845,369 A | | 12/1998 | Dunchock |
| 5,860,191 A | | 1/1999 | Sieger |
| 5,864,924 A | | 2/1999 | Rodriguez |
| 5,956,812 A | | 9/1999 | Moennig |
| 6,076,925 A | | 6/2000 | Kraut |
| 6,260,749 B1 | | 7/2001 | Horovitz |
| 6,357,642 B1 | | 3/2002 | Marchessault |
| 6,367,126 B1 | | 4/2002 | Rivkin |
| 6,533,414 B2 | | 3/2003 | Newler |
| 6,568,805 B1 | | 5/2003 | Dietz |
| 6,904,710 B2 | | 6/2005 | Lawrence |
| 7,240,374 B2 | * | 7/2007 | Fang ........................... 2/209.13 |
| 7,296,889 B2 | | 11/2007 | Dietz |
| 7,496,991 B2 | | 3/2009 | Avery |
| 7,553,018 B1 | | 6/2009 | Riazi |
| 7,979,920 B2 | | 7/2011 | Gilman |
| D643,212 S | | 8/2011 | Rathbun |
| 2002/0170147 A1 | | 11/2002 | Heller |
| 2006/0055866 A1 | | 3/2006 | Dietz |
| 2009/0128774 A1 | * | 5/2009 | Burlingham .................. 351/155 |
| 2013/0098957 A1 | | 4/2013 | Lee-Holowka |
| 2013/0167328 A1 | | 7/2013 | Brown |

* cited by examiner

*Primary Examiner* — Huy K Mai

(57) ABSTRACT

A detachable securement system for holding eyewear onto hats using magnetic force attraction and a laminated hook and loop securement strap assembly is described. A magnetic plate with rare earth magnets is placed inside the crown band of a hat. A receiver plate and securement strap assembly is located directly opposite on the front of the hat. The securement strap is a novel combination of both a hook and a loop fastening strip joined together adhesively to form a single, interlocking strap. The receiver plate is centrally located within the adhesive layers between the fastening strips. The strap when wrapped around the nose guard area of eyewear firmly interlocks onto itself. The combined use of magnetic force attachment and a single, interlocking securing strap provides a convenient means for securing and storing eyewear on hats.

9 Claims, 9 Drawing Sheets

MAGNETIC SECUREMENT DEVICE FOR EYEWEAR ON HATS

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING

Not Applicable

BACKGROUND OF THE INVENTION

The following is a tabulation of some related prior art:

U.S. Patents

| Pat. No. | Kind Code | Issue Date | Patentee |
| --- | --- | --- | --- |
| 2,644,212 | A | Jul. 7, 1953 | Markowitz |
| 3,178,784 | A | Apr. 20, 1965 | Krauthamer |
| 4,136,934 | A | Jan. 30, 1979 | Seron |
| 4,458,384 | A | Jul. 10, 1984 | Arnold |
| 4,969,239 | A | Nov. 13, 1990 | Bruno |
| 5,794,312 | A | Aug. 18, 1998 | O'Mahony |
| 5,842,613 | A | Dec. 1, 1998 | White |
| 5,845,369 | A | Dec. 8, 1998 | Dunchock |
| 5,860,191 | A | Jan. 19, 1999 | Sieger |
| 5,864,924 | A | Feb. 2, 1999 | Rodriguez |
| 5,956,812 | A | Sep. 28, 1999 | Moennig |
| 6,076,925 | A | Jun. 20, 2000 | Kraut |
| 6,260,749 | B1 | Jul. 17, 2001 | Horovitz |
| 6,357,642 | B1 | Mar. 19, 2002 | Marchessault |
| 6,367,126 | B1 | Apr. 9, 2002 | Rivkin |
| 6,533,414 | B2 | Mar. 18, 2003 | Newer |
| 6,568,805 | B1 | May 27, 2003 | Dietz |
| 6,904,710 | B2 | Jun. 14, 2005 | Lawrence et al. |
| 7,296,889 | B2 | Nov. 20, 2007 | Dietz |
| 7,496,991 | B2 | Mar. 3, 2009 | Avery |
| 7,553,018 | B1 | Jun. 30, 2009 | Riazi |
| 7,979,920 | B2 | Jul. 19, 2011 | Gilman |
| D643212 | S | Aug. 16, 2011 | Rathbun |

U.S. Patent Application Publications

| Publication Nr. | Kind Code | Publication Date | Applicant |
| --- | --- | --- | --- |
| 2002/0170147 | A1 | Nov. 21, 2002 | Heller |
| 2006/0055866 | A1 | Mar. 16, 2006 | Dietz |
| 2013/0098957 | A1 | Apr. 25, 2013 | Lee-Holowka et al. |
| 2013/0167328 | A1 | Jul. 4, 2013 | Brown |

The field of invention for the present device relates to eyewear securement devices and more specifically to magnetic eyewear holders for hats.

Users of eyewear frequently wish to remove them temporarily to allow participation in a sports activity such as golfing, walking, running, or bicycling. This is especially true for users with reading glasses or other special needs glasses. Users need a convenient, portable, safe and inexpensive way to secure their unused glasses while exercising or working. Cords or chains, mechanical clips, and direct pin mechanisms have been employed in securing and storing eyewear on garments and other apparel. An example of a cord that attaches to the eyeglass temples and is worn around the head or neck is shown in U.S. Pat. No. 4,136,934 (1979). Cord and chain designs are awkward and uncomfortable for active users attempting to exercise while wearing the tethered eyewear. Mechanical clip holders that are clipped to shirt pockets or other garment areas can be inflexible, awkward and unattractive, and tend to pull the garments down because of the combined weight of the glasses and the holder. Clip designs often contain loops, rings, hooks or lengths of cord for hanging eyewear that is similarly troublesome to active users as described above. Examples of mechanical clip holders are shown in U.S. Pat. No. 7,553,018 (2009), U.S. Pat. No. 6,533,414 (2003), U.S. Pat. No. 6,076,925 (2000), U.S. Pat. No. 5,956,812 (1999), U.S. Pat. No. 5,864,924 (1999), U.S. Pat. No. 5,860,191 (1999), U.S. Pat. No. 5,842,613 (1998), U.S. Pat. No. 5,794,312 (1998), and U.S. patent applications 2013/0167328 and 2013/0098957. Pin mechanisms secure eyeglass holders to apparel by insertion of a pin device through the target fabric and then docking in a receiver plate, usually on the inside of the garment. Pins are inherently invasive and damage the fabric during use. Examples of pin device mechanisms for attachment to garment or apparel are shown in U.S. Pat. No. 5,845,369 (1998) and U.S. Pat. No. 4,458,384 (1984).

Magnetic device holders also have been employed for securing eyewear and other objects on garments. Such magnetic devices can be strategically located on garment surfaces and they are non-invasive. Several such designs allow for insertion of the eyewear temples into an outside holder element or permit attachment to an outside holder element via loops, hooks or short chains. Magnetic devices provide an improved utility of use for active wearers that is inexpensive, removable, reusable and of lighter weight than previous eyewear securement systems as described above. Fastening devices incorporating magnets for securing eyewear and other small objects to garments are described in U.S. Pat. No. 7,496,991 (2009), U.S. Pat. No. 7,296,889 (2007), U.S. Pat. No. 6,904,710 (2005), U.S. Pat. No. 6,568,805 (2003), U.S. Pat. No. 6,367,126 (2002), U.S. Pat. No. 6,260,749 (2001), U.S. Pat. No. 3,178,784 (1965), U.S. Pat. No. 2,644,212 (1953), D643,212 (2011), and others including U.S. patent applications 2006/0055866 and 2002/0170147.

None of the current magnetic fastening devices for storing or securing eyewear are designed for use on hats. However, a few related eyewear or hat devices have been described in the literature. A clip-mounted magnetic holder for attaching golf ball markers to hats is described in U.S. Pat. No. 6,357,642 (2002). A non-magnetic fastening device that uses hook and loop fastening straps for securement of ski goggles to jacket sleeves is described in U.S. Pat. No. 4,969,239 (1990). Also, a unique cap with an integral eyeglass securing apparatus is described in U.S. Pat. No. 7,979,920 (2011). The apparatus is not detachable from the cap and incorporates different fastening structures. The integral design of the cap requires multiple magnets with securing straps fastened within the hat during manufacture. Such a hat appears expensive, unattractive, awkward and not very practical for those wanting only to store an extra set of eyewear.

BRIEF SUMMARY OF THE INVENTION

The eyewear retainer assembly of this invention provides a convenient, safe, non-invasive, and light-weight means for fastening and securing eyewear to hats. This eyewear retainer assembly is small, inexpensive, and fully detachable. The assembly uses no clips, pins or bulky mechanical fastening devices which can be awkward or damage hat fabric. There are no additional holder elements, chains or multiple straps that can become tangled. Target eyewear is conveniently held secure and safe on hats during physical activity such as playing tennis, jogging, golfing, or bicycling. The use of strong, light-weight neodymium magnets in combination with a single, fastening strap provides a convenient portability for the device with different hats. A user can secure and temporarily store a pair of reading glasses on a hat as sunglasses are being worn. The user can detach the retainer assembly and secure other eyewear on another hat at a later time. A functional solution is provided with this invention for storing extra eyewear on hats in a safe, compact, and accessible manner using state of the art materials.

The eyewear retainer assembly for hats is comprised of a magnetic component, and a receiver plate with a securement strap. The magnetic component is located inside the crown band facing the front of a hat. The receiver plate and securement strap are located on the outside front wall of the hat directly opposite the magnetic component inside the crown band.

The magnetic component is a thin plate made of a ferrous alloy with magnets on at least one side. In this preferred embodiment the magnetic plate employs two strong, lightweight magnets (preferably of the rare earth, neodymium) on the plate side facing the front of the hat. The magnetic plate and magnets are nickel-plated to minimize atmospheric deterioration and are affixed to the plate with a strong adhesive. Plate material made of any metallic or sufficiently rigid plastic material capable of holding the magnets also can be employed with similar results.

The receiver plate is made of nickel-plated, ferromagnetic material and has the same approximate dimensions as the magnetic plate but contains no magnets. The securement strap is a lamination of both hook and loop adhesive-backed fastening strips of substantially equal length. The securement strap contains the receiver plate within the adhesive layers of the fastening strips. The two strips are joined together along their adhesive sides. The receiver plate is centrally located at a right angle to the fastening strips within the adhesive layer. This distinctive construction permits the strap to firmly interlock onto itself when curled into a closed position. Hook and loop fastening strips without adhesive backing also may be used and joined together similarly with any good adhesive to produce suitable results. The securement strap and the receiver plate are oriented when installed by a user to make the loop fastening strip the inner side of the closed strap. This allows the softer, loop side of the strap to be available to receive the incoming eyewear.

The user simply inserts the magnetic plate into the front crown band of a hat and places the receiver plate and securement strap on the outside of the hat. The strong magnetic force attraction of the neodymium magnets with the receiver plate is immediate and robust holding the retainer assembly firmly in place. Eyewear is positioned inside the strap with the nose guard section resting on the soft loop side of the strap. The soft loop side assists users to position the eyewear, cushions eyewear during use, and minimizes eyewear slippage. The eyewear temple (ear) pieces remain open and lie backward above the ear lines. The eyewear is easily fitted into the strap whether the hat is on or off. The securement strap is then curled over and closed around the target eyewear nose bridge section to firmly interlock onto itself. The closed strap secures the eyewear to the receiver plate. The receiver plate is secured onto the hat by the magnetic plate inside the hat crown band. There are no critical alignments. Eyewear may be removed at any time by simply unfastening the securement strap. The complete eyewear retainer assembly is easily removed for portability by reversing the installation procedure. The receiver plate and securing strap on the outside of the hat are tilted forward and rotated slightly while holding the inner magnetic plate to break the force field. The magnetic plate is easily removed or left in place.

BRIEF DESCRIPTION OF THE SEVERAL VIEWS OF DRAWING

The following drawings provide specific information for the basic elements of the eyewear retainer assembly for hats in its preferred embodiment:

Figure 1:
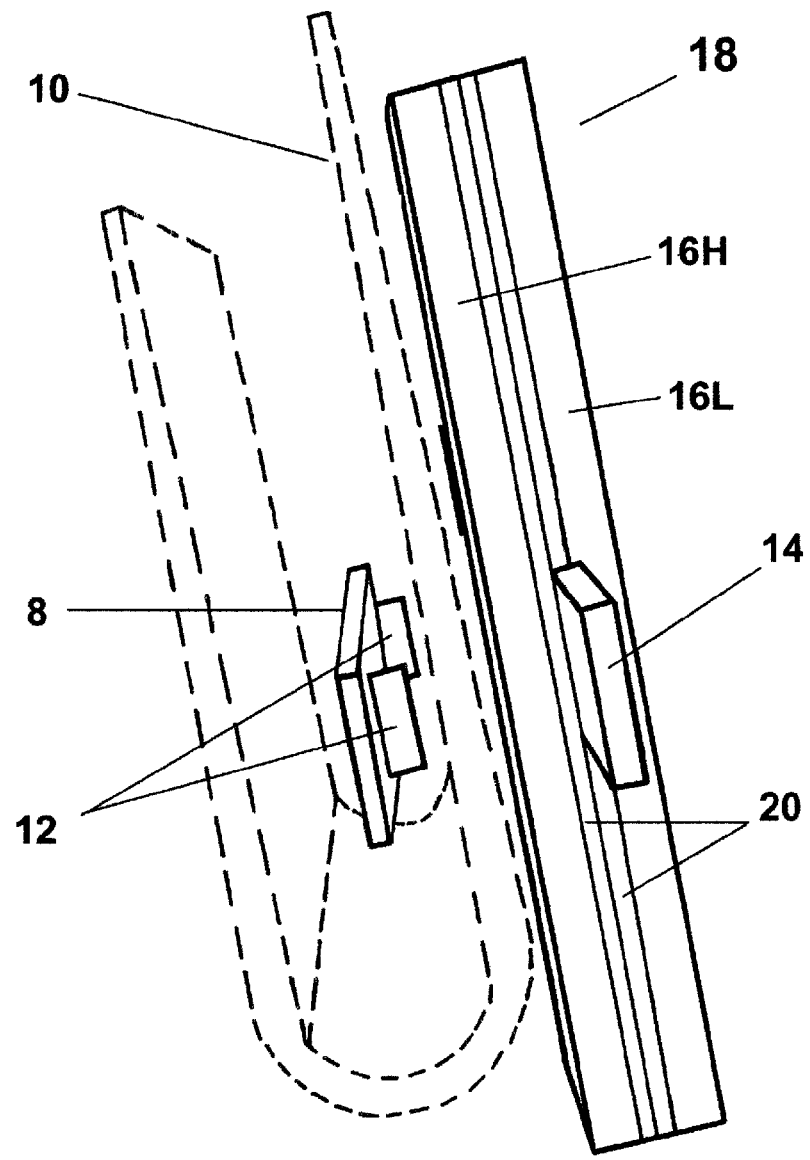
FIG. 1 is a perspective view of the magnetic eyewear retainer assembly in position as it would appear relative to the crown band of a hat.

| Drawings - Reference Numerals | |
| --- | --- |
| 8 | magnetic plate |
| 10 | hat crown band |
| 12 | neodymium magnet |
| 14 | receiver plate |
| 16H | hook fastening strip |
| 16L | loop fastening strip |
| 18 | securement strap |
| 20 | adhesive layer |

DETAILED DESCRIPTION OF THE INVENTION

A magnetic securement system that provides a means for securing and temporarily storing eyewear on hats is shown and described. This eyewear retainer assembly is non-invasive, fully detachable, and may be employed on a variety of hats. As used herein, the term "hat" means any type of headgear including but not limited to sports caps, hats, and visors. The term "eyewear" means any type of eyeglasses or eye protection equipment including but not limited to prescription eyeglasses, reading glasses, sunglasses, goggles or other eye protective glasses. There are no clips, cords, chains or multiple straps attached to the eyewear. There are no pins or mechanical fastening devices which can damage hat fabric. Eyewear is held securely and safely during exercising such as golfing, playing tennis, jogging, bicycling or even riding a motor scooter. The portable eyewear retainer assembly solves the problem of how to safely secure an extra set of eyewear on a hat. As an example, a pair of reading glasses can be simultaneously stored on a hat as sunglasses are being worn. Novel use of strong, light-weight neodymium magnets combined with an interlocking, single securing strap permits eyewear to be conveniently and safely secured onto a variety of hats. Thus, state of the art materials make it possible with this invention to create a functional solution for storing extra eyewear on hats in an inexpensive, portable, safe, accessible, compact, and convenient manner.

In the descriptions that follow, like parts are marked throughout the specifications and drawings with the same reference numerals, respectively. Certain features may be shown exaggerated in scale or in pictorial form in the interest of clarity and conciseness. A preferred embodiment is described in detail and shown in FIGS. 1-6 and is to be considered an exemplification of the principles of the invention. The preferred embodiment is not intended to limit the invention to that illustrated and described herein. Other embodiments may be employed separately or in any suitable combination to produce likewise desired results.

FIG. 1 is a prospective view of the preferred embodiment of the eyewear retainer assembly. Magnetic plate 8 is positioned within the walls of crown band 10 of a hat (not shown). Magnetic plate 8 is shown with two small neodymium magnets 12 facing the front of the hat. Receiver plate 14 and securement strap 18 are located on the outside front of the hat directly opposite magnetic plate 8. Receiver plate 14 and securement strap 18 are held to the hat surface due to the strong magnetic attraction between magnets 12 and receiver plate 14. The powerful, light-weight neodymium magnets 12 employed on magnetic plate 8 in the preferred embodiment can hold in excess of 30 times their weight. Receiver plate 14 is laminated within adhesive layer 20 of hook 16H and loop 16L fastening strips during manufacture. Receiver plate 14 is centrally located within adhesive layer 20 of the fastening strips at a right angle and approximately midway their length. In use, securement strip 18 and receiver plate 14 are oriented in order that softer, inner loop 16L side receives the nose guard of the target eyewear (not shown). Securement strap 18 is depicted in FIG. 1 in a fully open position with no eyewear for simplicity.

Figure 1A:
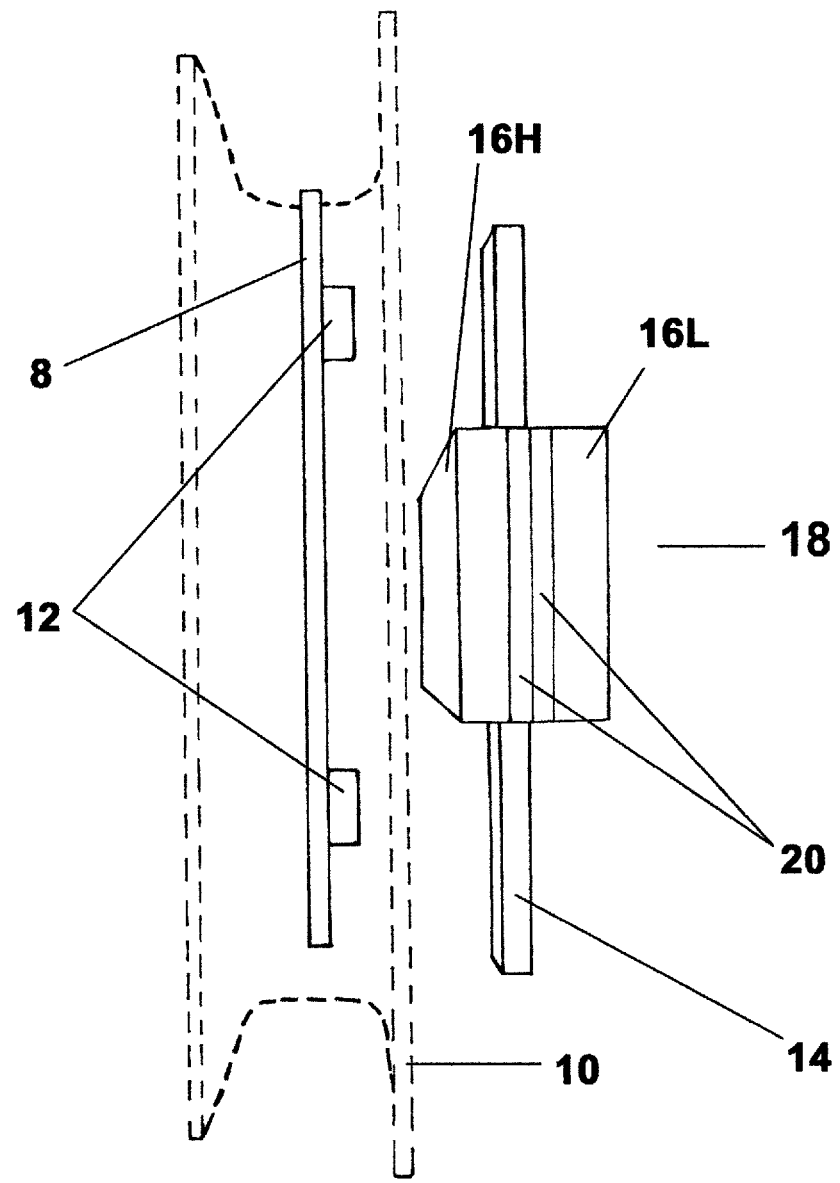
FIG. 1A is an alternate view from the top to further illustrate the magnetic plate inside the crown band of a hat, and the receiver plate and securement strap aligned directly opposite.

FIG. 1A is an alternate view from the top of the preferred embodiment of the eyewear retainer assembly. Magnetic plate 8 with two small neodymium magnets 12 is located within crown band 10 of a hat (not shown). Magnetic plate 8 faces receiver plate 14 and securement strap 18 which are located on the front of the hat. Receiver plate 14 is centrally located at a right angle within adhesive layer 20 of hook 16H and loop 16L fastening strips. Securement strap 18 is depicted in a fully open position with no eyewear for simplicity.

Figure 2:
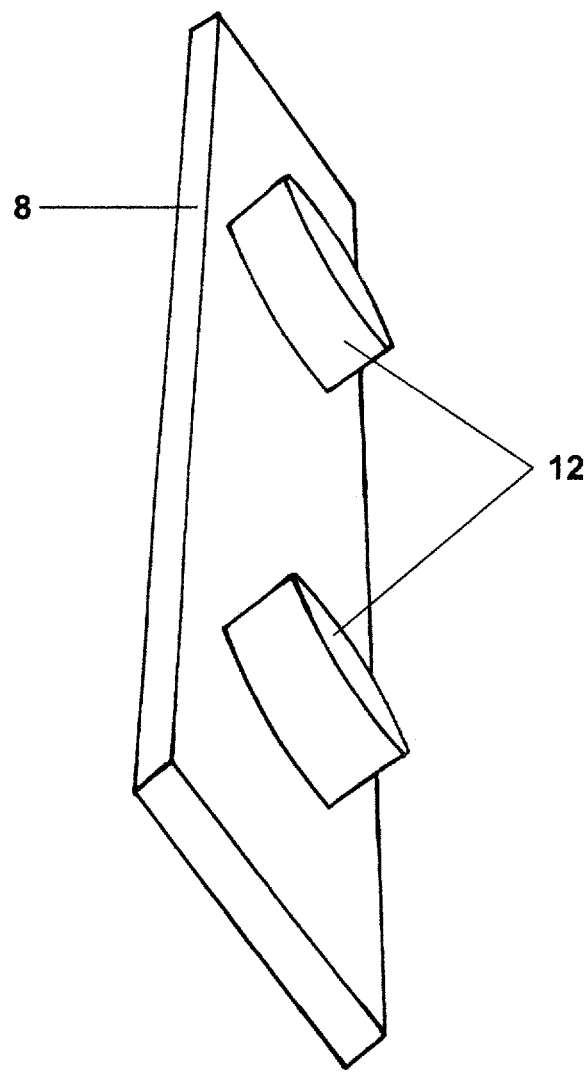
FIG. 2 is a perspective view of the magnetic plate with its magnets.

Magnetic plate 8 as depicted in FIG. 2 is a small, rectangular metal plate (1 mm×14 mm×45 mm) made of a nickel-plated ferrous alloy. Plate material of any metallic or sufficiently rigid plastic material may be employed with similarly suitable results. Attached to magnetic plate 8 are two strong, light weight, rare earth neodymium magnets 12 nominally centered 20 mm apart. Small, light-weight neodymium magnets 12 employed in the preferred embodiment can each hold 30 times their weight. Magnets 12 are nickel-plated to minimize atmospheric deterioration and are affixed to magnetic plate 8 with a cyanoacrylate adhesive. Other strong adhesives are equally suitable. The preferred embodiment as shown in FIG. 2 employs cylindrical, neodymium magnets 12 approximately 2.5 mm thick×9 mm diameter weighing less than $1/10^{th}$ ounce each. The dimensions of magnetic plate 8 and magnets 12, and the spacing of the magnets on the magnetic plate are not critical.

Figure 3:
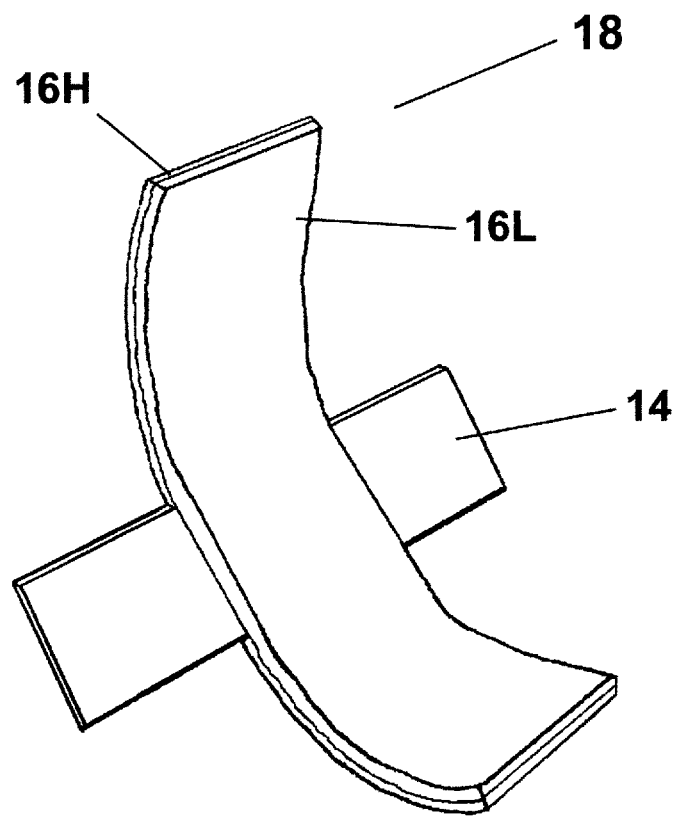
FIG. 3 is a perspective view of the receiver plate with the securement strap in a partially-closed position.

Receiver plate 14 with attached securement strap 18 in a partially-closed position is shown in FIG. 3. Receiver plate 14 is made of a nickel-plated ferromagnetic alloy material comprised of aluminum, cobalt and nickel with approximately 50% of iron, such as Alnico® alloy. The advantages of such material are its higher magnetic saturation capability, lower coercivity (resistance to loss of magnetism) and favorable weight. Other nickel-plated ferrous alloys or steel are also effective for this application. Receiver plate 14 is approximately 1 mm×14 mm×45 mm and nominally centered between hook 16H and loop 16L fastening strips of securement strap 18. Securement strap 18 is nominally 4 mm×12 mm×90 mm. Precise alignment and dimensions of receiver plate 14 and securement strap 18 are not critical.

Figure 3A:
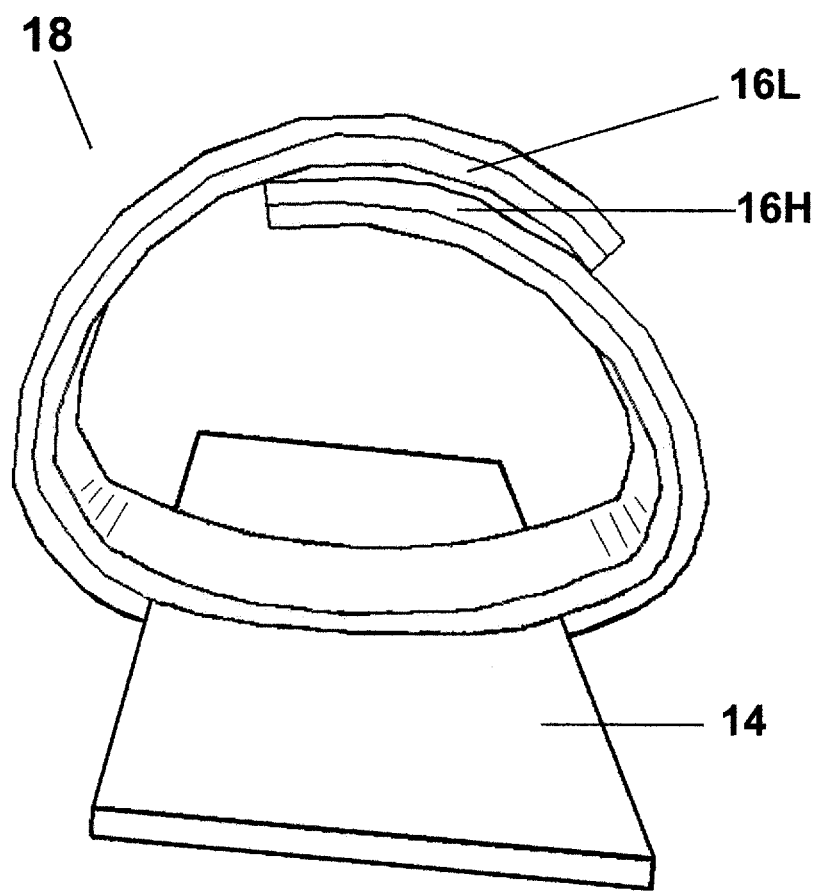
FIG. 3A is an alternate view of the receiver plate with the inner loop side of the securement strap shown interlocking with the outer hook side.
Figure 3B:
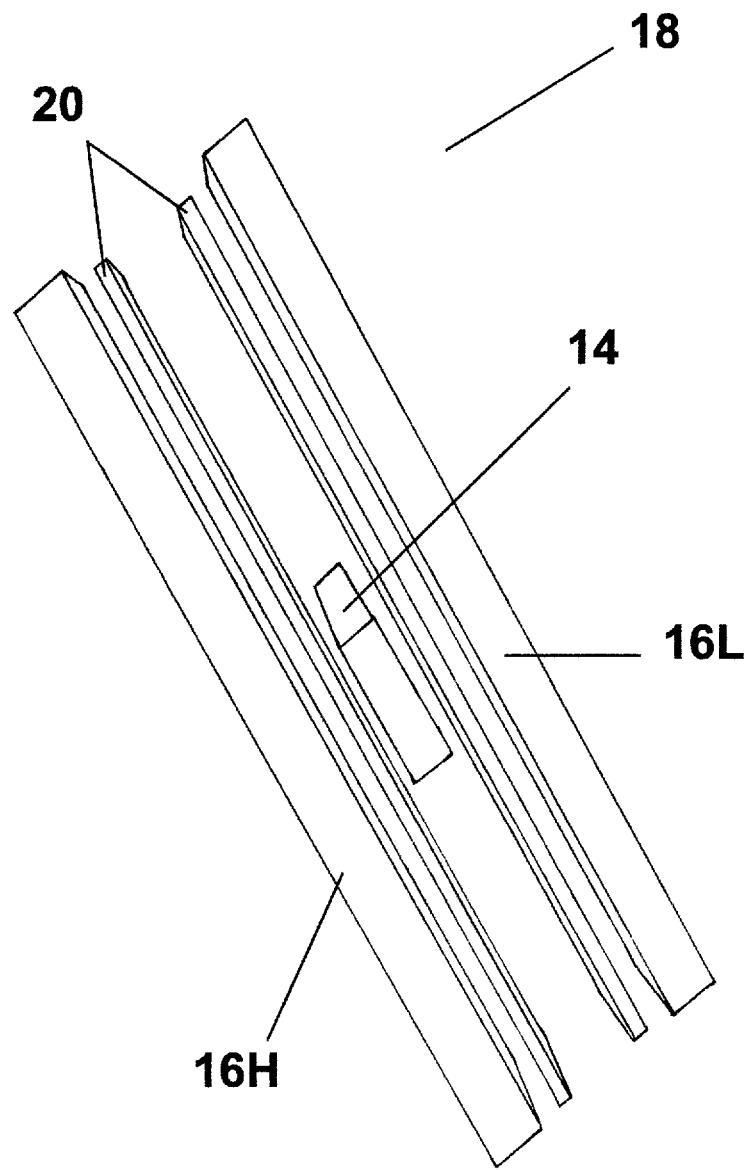
FIG. 3B is an exaggerated view of the receiver plate and the securement strap used only to illustrate the laminated construction of the receiver plate and strap.

FIG. 3A illustrates an alternate view of receiver plate 14 and securement strap 18. The upper portion of securement strap 18 is shown wrapped around the bottom portion of the strap in a closed position. In this way, inner loop 16L side and outer hook 16H side interlock when joined together. In this preferred embodiment, hook side 16H of the strap is on the outside and the softer loop 16L side is on the inside when curled around the nose guard section of target eyewear (not shown). Inner loop 16L side thereby helps position, cushion, and prevent slippage of the eyewear during use.

FIG. 38 is an exaggerated view of receiver plate 14 and attached securement strap 18 used only to illustrate the unique laminated construction design of the components. Hook 16H and loop 16L adhesive-backed fastening strips are laminated together along their adhesive layer 20 sides. Receiver plate 14 is nominally centered between the fastening strips at an approximate right angle to the adhesive layer 20 during manufacture.

Figure 4:
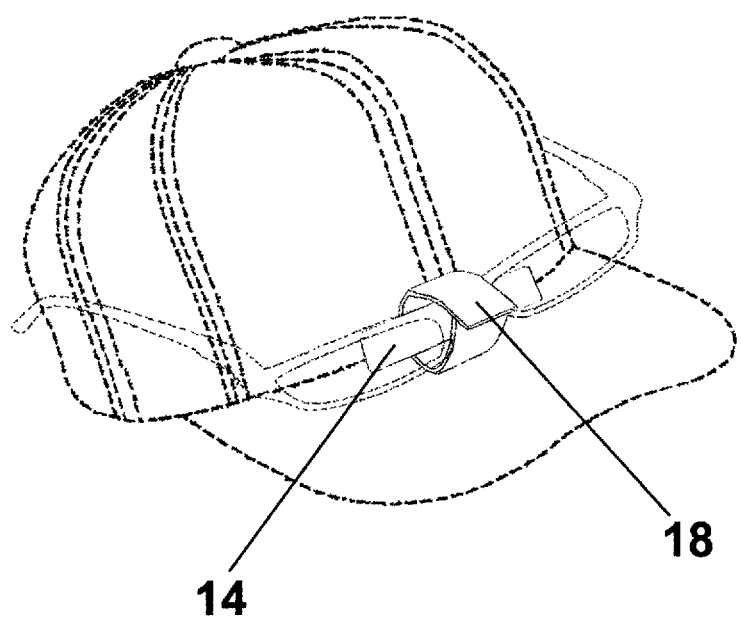
FIG. 4 is a perspective view of a hat with a pair of eyeglasses in the secured position using the portable eyewear retainer assembly.

The preferred embodiment of the invention with a set of secured eyeglasses on a sports hat is illustrated in FIG. 4. Receiver plate 14 with securement strap 18 is magnetically attached to the hat via the magnets on the magnetic plate (not shown) directly opposite and within the crown band (not shown) of the hat. Securement strap 18 is shown wrapped and interlocked around the nose bridge section of the eyeglasses. The eyewear temple pieces are open and rest over the ear lines.

Figure 5:
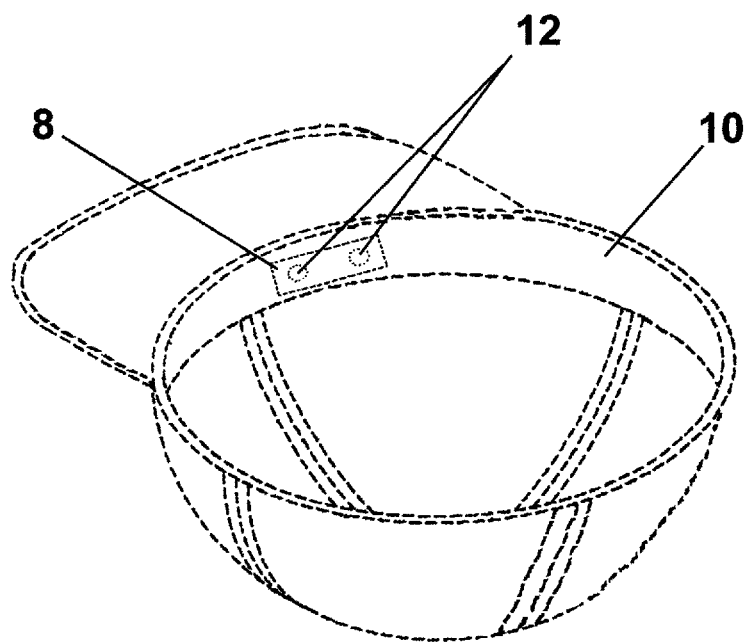
FIG. 5 is an underside view of a hat with the magnetic plate located inside the crown band and facing the front of the hat.

The underside of a sports hat with magnetic plate 8 located inside crown band 10 is depicted in FIG. 5. In the preferred embodiment magnets 12 face a securement strap (not shown) and a receiver plate (not shown) which are directly opposite and on the front of the hat.

Figure 6:
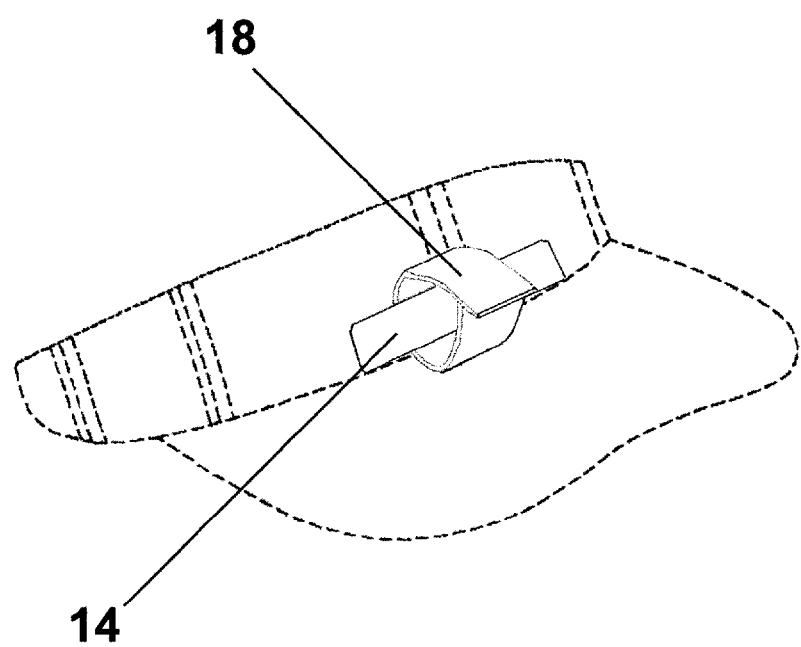
FIG. 6 is a perspective view of a visor with the receiver plate and securement strap located on the front of the visor.

A visor is depicted in FIG. 6 with receiver plate 14 and securement strap 18 positioned on the outside front of the visor. Securement strap 18 is shown without eyewear in its closed position for simplicity.

I claim:

1. An eyewear retainer assembly for removably retaining an eyewear on a hat utilizing magnetic force, with said assembly being comprised of:
   a. a magnetic plate having at least two spaced-apart magnets on one side thereof, said magnetic plate disposed on the inside of said hat,
   b. a receiver plate made of ferromagnetic material magnetically coupled to said magnetic plate from the outside of said hat,
   c. a securement strap comprised of both an adhesive-backed, hook fastening strip and an adhesive-backed, loop fastening strip of substantially equal length joined together along their adhesive sides to form a single interlocking strap for removably retaining said eyewear, d. said receiver plate being centrally disposed within and at an approximate right angle to the adhesive-backed fastening strips of said interlocking strap, e. whereby together, said receiver plate and said interlocking strap provide means to secure said eyewear to said hat by the combined magnetic attractiveness between said magnetic plate and said receiver plate, and the unique fastening characteristics of said interlocking strap comprised of both adhesive-backed, hook and loop fastening strips in a single interlocking strap.

2. The eyewear retainer assembly of claim 1 wherein said magnets are neodymium.

3. The eyewear retainer assembly of claim 1 wherein said magnets are nickel coated.

4. The eyewear retainer assembly of claim 1 wherein said magnetic plate is made of nickel-plated ferrous alloy.

5. The eyewear retainer assembly of claim 1 wherein said magnetic plate is made of metal.

6. The eyewear retainer assembly of claim 1 wherein said magnetic plate is made of plastic.

7. The eyewear retainer assembly of claim 1 wherein said receiver plate is made of nickel-plated ferrous alloy.

8. The eyewear retainer assembly of claim 1 wherein said receiver plate has affixed on one side, at least two spaced-apart magnets.

9. The eyewear retainer assembly of claim 1 wherein said securement strap is comprised of both a hook and a loop fastening strip of substantially equal length joined together at their backs using a strong adhesive to form a single, interlocking strap.

* * * * *